Patented Sept. 1, 1936

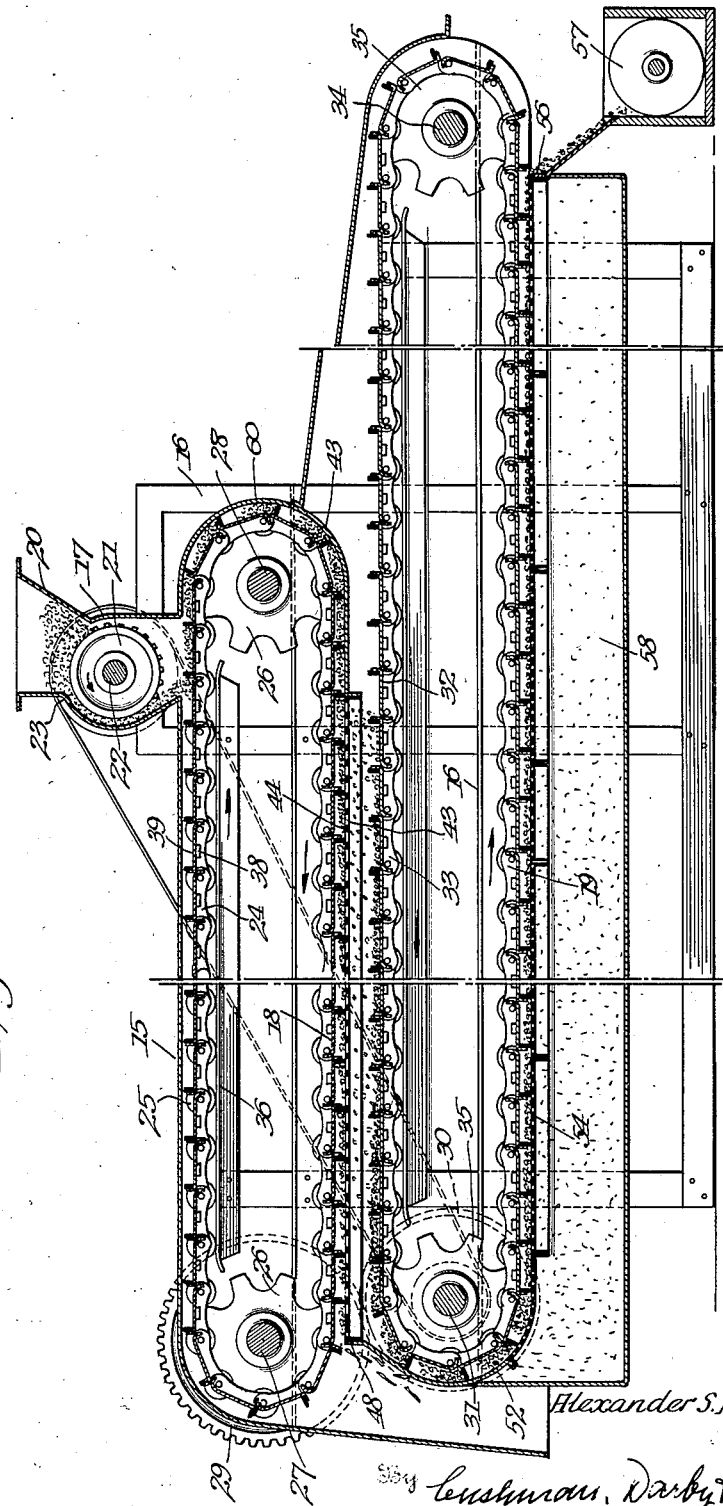

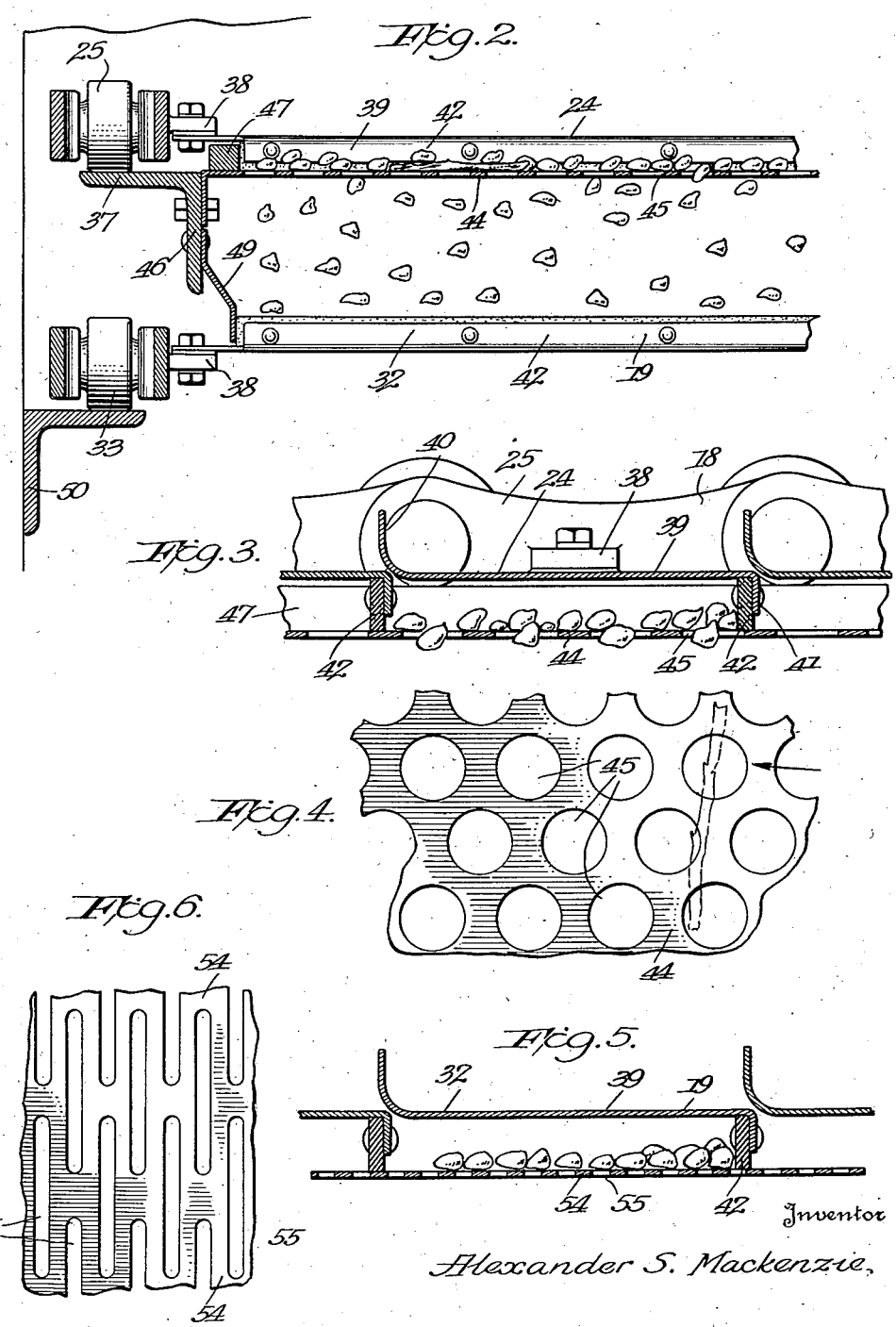

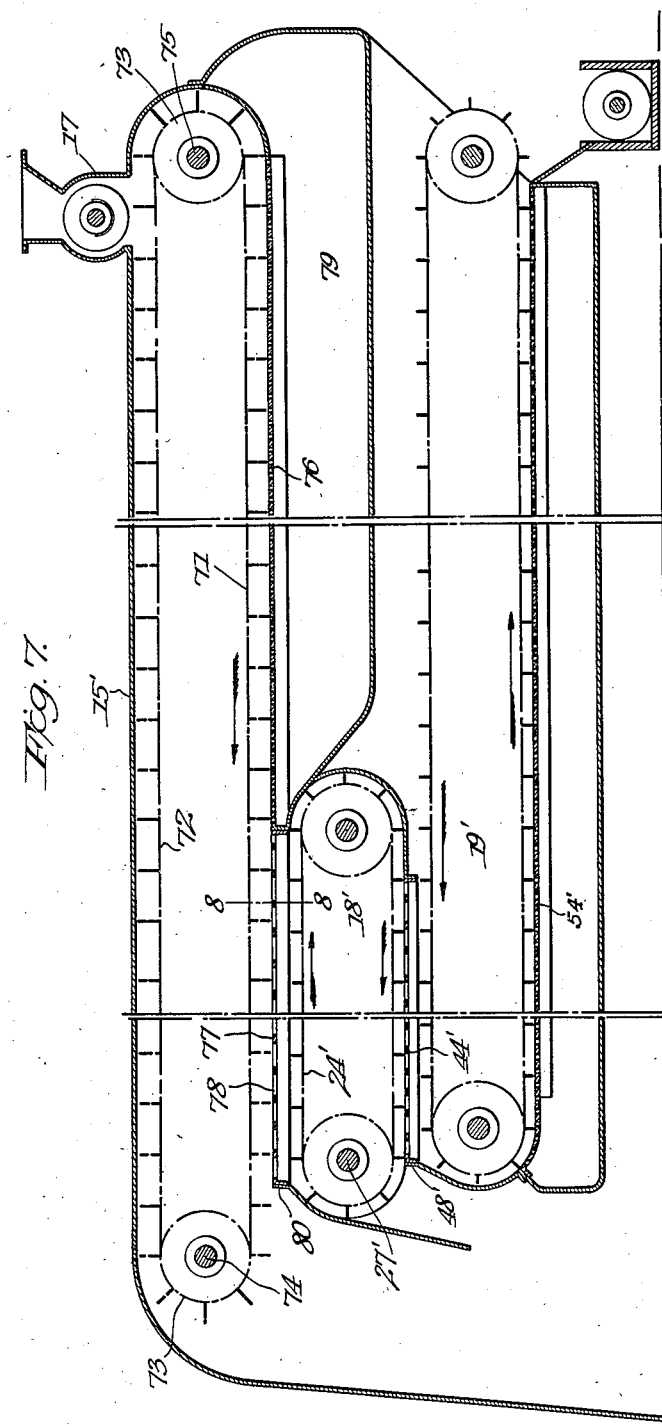

2,053,038

UNITED STATES PATENT OFFICE 2,053,038

APPARATUS FOR SEPARATING AND CLEANING MATERIAL

Alexander S. Mackenzie, Houston, Tex., assignor to Abilene Cotton Oil Company, Abilene, Tex., a corporation of Texas Application July 31, 1933, Serial No. 683,081

4 Claims. (Cl. 209—355)

The present invention relates to a method and apparatus for separating and cleaning material and, more particularly, to a method and apparatus for cleaning cotton seed.

When cotton seed is delivered to a mill for treatment to remove the oil therefrom or for other processing, a considerable amount of sand, cotton burrs, stems, leaf-trash and other foreign matter is mixed with the mass of seed, all of which must be removed from the seed before further treatment.

The practice usually followed to remove foreign matter from the seed is to first run the mass of seed and foreign matter axially through a revolving screening drum, which drum is provided with perforations sufficiently large to permit the seed to drop through them and out of the drum, it being intended that larger particles of foreign matter will pass axially and out of the far end of the drum. The seed and smaller particles of foreign matter passed through the perforations in the wall of the drum are then placed upon a shaking screen having relatively small perforations therein, the purpose of this treatment being to cause the smaller particles of foreign matter to drop through the screen while the seed will remain on the screen and may be removed therefrom.

One difficulty of the primary treatment of the mass in the revolving drum results from the tumbling action to which the mass in the revolving drum is subjected, because this action causes lengthy objects, such as sticks, stems and the like, to be up-ended in the mass so that they may pass through the perforations in the wall of the drum with the seed. Since these objects are too large to subsequently pass through the screen of the shaking separator, they will remain in the mass of seed finally obtained from that separator. Also, the shaking action of the shaking separator causes the lighter particles of foreign matter to be moved or floated to the top of the mass on the shaking screen so that the supposedly cleaned seed may contain some smaller particles of foreign matter, as well as the larger objects or particles referred to above. The shaking screen is usually formed with a relatively large screen area in an effort to correct this latter difficulty, but, even with a large screen, the cotton seed are not entirely cleaned.

The principal object of the present invention is to provide an apparatus and method for cleaning cotton seed which will result in complete removal of foreign matter from the seed with a minimum of treatment. The apparatus and method may also be used for cleaning or separating material other than cotton seed.

The apparatus preferably comprises a primary separating mechanism consisting of moving means including drag members, which means moves the mass with respect to a screen having apertures therein of sufficient size to permit seed and relatively small particles of foreign matter to pass therethrough, larger particles of foreign matter remaining upon the screen and being moved from the far end thereof. The seed and smaller particles of foreign matter passed through the screen will be received by a secondary separator including a moving means which will move the mass of seed and smaller particles of foreign matter with respect to a second screen. The second screen is provided with apertures of insufficient size to permit the seed to pass therethrough, so that the cotton seed will be passed off the far end of the screen while foreign matter will fall through the apertures.

Another important object of the invention is to provide an apparatus and method whereby the mass of material to be separated will be moved through the apparatus in a relatively thin stream so that lengthy objects or articles such as sticks or the like will not become up-ended during movement with respect to the first screen and thereby be caused to fall through the apertures of that screen.

Still another object of the invention is to provide a means and method whereby the mass of material fed to the apparatus is so handled before the mass reaches the primary screen, that lengthy objects or articles such as sticks or the like will be moved to lie transversely of the path of movement of the means for moving the mass.

A further object of the invention is to so arrange the moving means of the primary separating mechanism that this means, preferably an apron, will, while passing over the screen associated therewith, be spaced a sufficient distance from the mass of material moving therewith to permit the material to move freely across the screen and without any downward pressure being exerted thereon. However, the apron or other moving means will be so closely positioned with respect to the screen that it will not be possible for lengthy objects or articles such as sticks or the like to become up-ended during movement across the screen of the primary separating mechanism.

Machines particularly adapted for separating a mass of grain, for example, for separating wheat from oats, by means of aprons movable over screens have heretofore been provided. In these machines, the wheat and oats are moved across a stationary perforated screen having perforations therein of sufficient size to permit the wheat to pass through such perforations, the oats passing over the perforations and off the far end of the screen. In these machines, the wheat passed through the screen perforations, drops upon a second apron which moves it across a second screen having smaller perforations therein through which particles smaller than the wheat may fall, the wheat passing off the end of the screen. However, in such machines, the apron which carries the wheat and oats over the first screen is intended to be in close contact with the surface of the screen so that the wheat will be pressed against the screen. The apparatus of the present invention is an improvement upon such prior art machines in that the apron of the first screen of the present apparatus is spaced a sufficient distance from that screen to preclude the possibility of the mass of material being pressed against the surface of the screen. The result of this arrangement is to cause the seed and other particles in the mass to move freely across the screen in the position in which they are fed thereto and so that the seed will fall through the screen apertures of their own accord, there being no pressure exerted upon the mass to tend to force other and larger objects or particles, for example, lengthy objects, through the screen.

Still another object of the invention is to provide an apparatus and method for causing the seed to roll with respect to the apertures of the screen of the secondary separating mechanism to expose the entire surface of the seed to the apertures, which rolling action will cause the edges of the apertures to remove foreign particles from the surface of the seed.

Another object of the invention is to provide an apparatus of the type described wherein the mass fed to the apparatus may be given a preliminary separating treatment to remove extremely large objects from the mass before the mass is fed to the primary separating mechanism.

Other objects and advantages of the invention will be apparent from the following specification and drawings, in which—

Figure 1 is a longitudinal vertical sectional view through the apparatus of my invention;

Figure 2 is a transverse vertical sectional view through one side of the apparatus of Figure 1;

Figure 3 is a fragmentary longitudinal vertical sectional view showing a portion of one of the aprons and screens used in the apparatus;

Figure 4 is a plan view showing a portion of the screen of Figure 3;

Figure 5 is a fragmentary vertical longitudinal sectional view of another apron and screen used in the apparatus;

Figure 6 is a plan view showing a portion of the screen of Figure 5;

Figure 7 is a longitudinal vertical sectional view diagrammatically showing another form of the apparatus; and Figure 8 is a fragmentary longitudinal vertical sectional view showing a portion of an apron and screen used in the apparatus of Figure 7.

Referring to the form of my apparatus shown in Figures 1 to 6, inclusive, the numeral 15 designates the casing of the apparatus which has associated therewith a supporting framework of suitably arranged upright and horizontal members 16. A feeding mechanism 17 is provided at the upper portion of the framework and casing, by means of which cotton seed to be cleaned is delivered to the separating mechanisms of the apparatus. The cotton seed received from the feeding device 17 passes through a primary separating mechanism 18 in the upper portion of the casing and then passes through a secondary separating mechanism 19 positioned beneath the mechanism 18.

The feeding mechanism 17 comprises a trough or hopper 20 to which cotton seed to be cleaned may be delivered in any suitable manner. A feed roll 21 secured to a shaft 22 moves the cotton seed from the trough 20 to the primary separating mechanism 18. In order to insure that the cotton seed will move from the hopper 20 in a comparatively thin stream, the wall 23 of the feeding mechanism casing opposite the downwardly moving side of the feed roll is positioned close to the roll.

The primary separating mechanism 18 comprises an endless conveyor or apron 24 including endless link chains 25 at each edge thereof. The link chains 25 move about relatively large sprocket wheels 26 fixed adjacent the ends of shafts 27 and 28 journaled at opposite ends of the upper portion of the casing 15. The shaft 27 is provided with a relatively large gear 29 which meshes with a gear 30 fixed to a lower shaft 31. An endless conveyor or apron 32 similar in form to the apron 24 and provided with endless link chains 33 at each edge thereof is included in the secondary separating mechanism 19, the chains 33 engaging pairs of large sprocket wheels 35 respectively fixed to shaft 31 and to a shaft 34 spaced from the shaft 31 as shown in Figure 1 of the drawings. The direction of movement of the aprons is indicated by the arrows shown thereon.

The shaft 31 may be driven from any suitable source of power and the engagement of the gear 30 carried thereby with the gear 29 on shaft 27 operates the upper apron 24. A pulley fixed to the shaft 31, drives the shaft 22 of the feed roll 21 by means of a belt. In order to cause the lower apron 32 to move somewhat more rapidly than the upper apron 24, the gear 30 is preferably somewhat smaller than the gear 29 of the primary cleaning mechanism.

Trackways 36 are provided upon the inner walls of the upper portion of the casing 15 upon which the upper runs of the rollers of the link chains 25 of the upper apron 24 move. A second set of trackways 37 is provided to support the links 25 of the chains of the lower run of the apron 24. Each of the trackways may be formed of angle bars as shown by the angle bar 37 in Figure 2. As indicated in Figures 2 and 3, the links 25 are provided with inwardly projecting lugs 38 to which the opposite edges of plate members 39 are bolted, the plate members forming the surface of the apron. As shown in Figure 3, each of the plate members 39 includes an inwardly projecting flange or shoulder 40 at one end and an outwardly projecting flange or shoulder 41 at its opposite end, the outwardly projecting flange 41 preferably being at the rearward end of the plate, with regard to the direction of movement of the apron. A strip 42 of rubber, leather or similar material is secured to the flange 41. By this apron construction, a series of pockets are provided along the apron, the strips 42 serving as spaced drag members.

The casing 15 of the apparatus is of such conformation that the inner surface of its upper portion will be in brushing contact with the drag members 42 during the beginning of the downward movement of the plates 39 about the sprocket wheels of the shaft 28 and a partition wall 43 contacts with the drag members 42 during their extreme downward movement, to prevent material from falling from the apron pockets, as shown in Figure 1.

A screen 44 having apertures or perforations 45 therein extends from the inner edge of the partition wall 43 and toward the opposite end of the apparatus, the side edges of the screen being fixed to the depending flanges 46 of the lower trackways 37. Shoulders 47 may be provided along the upper edges of the screen 44 to prevent material from falling from the screen.

The drag members 42 will be in contact with the upper surface of the screen 44 during their movement along the same.

The screen apertures or perforations 45 are of a size to permit cotton seed and particles of a corresponding or smaller size to fall through the screen, larger particles of foreign matter being moved off the end 48 of the screen to drop upon the floor of the mill or upon a suitable conveyor.

The seed and foreign matter passing through the screen 44 will drop upon the upper run of the lower apron 32, cant-boards 49 being provided on the flanges 46 of the trackways 37 to guide the falling seeds and particles to the apron 32. The apron 32 is of a construction identical with that of the apron 24 but is preferably somewhat longer. The rollers 25 of the links of the lower chains move upon trackways 50 during their movement about the upper run of the apron 32 and are supported upon lower trackways during movement about the lower run of the apron.

The casing 15 includes a wall 52 with which the ends of the drag members 42 of the lower apron 32 will be in contact during their downward movement and a screen 54 is supported beneath the lower run of the apron 32, preferably upon the lower trackways so that the drags 42 will be in contact therewith as shown in Figure 5. The screen 54 is provided with slots 55 (Figures 5 and 6) which extend transversely of the path of movement of the drags 42. The slots 55 are of less width longitudinally of the screen 54 than the diameter of the cotton seed, with the result that only the small particles of foreign matter remaining in the mass of cotton seed will fall through the screen 54, the cotton seed remaining on the screen and being moved in the direction indicated to the end 56 of the screen, from which they fall upon a conveyor 57 for removal from the apparatus. In order to facilitate the separation of all fine particles of foreign matter from the cotton seed passing over the screen 54, a suction or vacuum chamber 58 may be provided beneath the screen 54.

The operation of the apparatus shown in Figures 1 to 6 is as follows:—

The mass of cotton seed and foreign material delivered to the feeding mechanism 17 will be moved downwardly about the feed roll 21 in a relatively thin stream which will lie upon the surfaces of the plates 39 between the then upwardly projecting drag members 42. The apron 24 moves in the direction indicated by the arrow in Figure 1 and downwardly about the sprocket wheel 26 on shaft 28. The result of the downward movement of the mass of material will be to cause the material in the pockets formed by the spaced drag members to fall downwardly against the drag members as indicated at the point 60 in Figure 1 so that any lengthy particles of foreign matter such as sticks or the like will tend to fall in a position parallel to the drag members 42, that is, transversely to the path of movement of the apron 24, as shown in dotted line in Figure 4. As the mass in the pockets continues its downward movement past the point 60, it will be spread more evenly between the drag members and will then pass across the surface of the primary screen 44. During the movement of the mass across the screen 44, cotton seed and smaller particles of foreign material will fall through the apertures 45 of the screen while larger particles of foreign matter will be moved off the end 48 of the screen and will fall upon a suitable conveyor, not shown.

It will be observed that the space between the upper surface of the screen 44 and the plates 39 of the apron 24 is of limited depth. By this arrangement, it will be impossible for lengthy particles of foreign matter, for example sticks, to become up-ended in the mass moving across the screen 44 and the possibility of the end of a stick or the like being caught in one of the apertures and dropping therethrough will be obviated. The fact that lengthy objects or particles will be received upon the screen 44 in a position transverse to the path of movement of the apron will also prevent lengthy articles from having one end extending forwardly to become caught against the edge of an aperture 45 and thereby become up-ended to fall through an aperture 45. By this structure, large objects and particles will move entirely across the screen 44 and will fall from the end 48 of the screen and may be removed by a suitable conveyor.

The seeds and smaller particles of foreign matter passed through the screen 44 will drop upon the upper run of the apron 32 of the secondary separating mechanism 19. This conveyor moves in the direction of the arrows indicated thereon in Figure 1 and because it moves more rapidly than the apron 24, material falling through the screen 44 will be removed in a thin layer. The pockets and drags formed upon the conveyor 32 will move the material downwardly about the sprocket wheel 35 on shaft 31 and across the screen 54 of the secondary separator 19. In moving across the screen 54, the seed, being in a thin layer and in loose condition, will roll upon the transverse slots 55 of the screen, exposing their entire surface to the slots and screen. The rolling movement of the seed will cause particles of foreign matter upon the seed to be removed therefrom by a gentle scraping action resulting from contact of the seed with the side and end edges of the slots. If desired, the cleaning action of the secondary separator 19 may be increased by means of reduced pressure or suction in the chamber 58 beneath the screen 54.

The conveyor 57 will remove the cleaned seed from the apparatus and a conveyor means may be provided to remove the foreign matter passed through the secondary screen 54.

The apparatus illustrated in Figures 7 and 8 is generally similar to that shown in Figures 1 to 6, the principal difference between the two apparatuses being that the Figure 7 structure includes a means to subject the mass of cotton seed to a preliminary cleaning or separating action before delivering it to a primary separating mechanism corresponding to the primary mechanism 18 of Figure 1.

Referring to Figure 7 of the drawings, a feeding device 17' is provided at the upper portion of the casing 15', which feeding device delivers the mass of material to be separated to a preliminary separating mechanism 71. The preliminary separating mechanism 71 comprises an apron 72 formed of elements identical with those of the elements of the aprons of the Figure 1 apparatus, except as hereinafter noted. The apron 72 moves upon large sprocket wheels 73 secured to shafts 74 and 75 respectively at each end of the casing 15'.

A screen 76 having relatively small apertures or perforations therein is provided beneath the lower run of the apron 72 in advance of a second screen 77 having relatively large apertures 78 therein. A vacuum or suction chamber 79 may be provided beneath the screen 76 to draw sand or the like from the mass of seed and foreign matter passing over this screen. Objects or articles of foreign matter of too large size to pass through the perforations 78 of the screen 77 will move off the end 80 of that screen while seed, as well as foreign matter, which passes through the perforations 78 of the screen 77 will fall upon an apron 24' of a separating mechanism 18'.

The separating mechanism 18' corresponds exactly in structure and function to the primary separating mechanism 18 of the apparatus of Figure 1 and will therefore be referred to as a primary separating mechanism. It will be observed that the primary separating mechanism 18' of Figure 7 may be of somewhat less length than the corresponding mechanism of Figure 1. A secondary separating mechanism 19' is provided beneath the primary separating mechanism 18' and its construction and operation is identical with that of the secondary separating mechanism 19 of Figure 1.

The shaft 74 of the preliminary separating mechanism 71 may be driven by means of a gear on the shaft 74 intermeshing with a gear provided on the shaft 27'.

The apertures 78 of the screen 77 beneath the preliminary separating mechanism 71 are preferably of the same size as the apertures of the screen 44' beneath the primary separating mechanism 18' but, as indicated in Figure 8, the plate members 31' of the apron 72 of the preliminary separating mechanism are further spaced from the screen 77 than is the case with the plates of the primary separating mechanisms 18 of Figure 1 and 18' of Figure 7. The drag members 41' on the plates 39' of the apron 72 may be formed of angle bars secured to the rear edges of the plates and need not contact with the screen 77.

The manner of operation of the apparatus of Figure 7 is exactly similar to that of the apparatus of Figure 1 except that the provision of the preliminary separating mechanism 71 enables unusually large objects, for example, bolts or large stones, to be separated from the mass of material before the material is given a separating treatment corresponding to that of the apparatus in Figure 1. Because the perforations 78 of the screen 77 are of larger size than the size of the seeds to be treated and the plates 39' of the apron 72 are spaced somewhat higher above the surface of the screen 77 than is the case in the screen of the primary conveyor 24 of the Figure 1 apparatus, unusually large objects or articles such as bolts or stones of too large a size to pass through the the apertures 78 of screen 77, will pass off the end 80 of screen 77 while seed and some large objects and particles will pass through the apertures 78 and onto the upper run of the primary apron 24'. Because of the fact that the space between the surface of the screen 77 and the apron 72 is relatively high, lengthy objects such as sticks may become tilted or up-ended in passing over the screen 77 and may thereby fall through the screen onto the apron 24'. However, since the subsequently acting separating mechanisms 18' and 19' have the same effect as the separating mechanisms 18 and 19 of the Figure 1 apparatus, the sticks and large particles will be sebsequently separated from the mass by passing off the end 48' of screen 44' before the seeds and small particles move to the secondary separating mechanism 19'.

The fine mesh screen or perforated plate 76 which is provided beneath the apron 72 of the preliminary separator 71 has meshes therein of sufficient size to permit the passage therethrough of sand. A vacuum or suction effect may be exerted in the chamber 79 beneath the screen 76 to draw sand as well as particles of foreign matter of like size through screen 76.

It will be obvious that a sand screen similar to 76 may be included beneath the lower run of the apron 24 of the primary separator 18 of the apparatus of Figure 1.

It will be understood that the invention is not limited to the details of construction shown in the drawings and that the examples of the use of the apparatus and method which have been given do not include all of the uses of which the apparatus is capable or by which the method may be followed; also, that the phraseology employed in the specification is for the purpose of description and not of limitation.

I claim:—

1. An apparatus of the class described, including an endless drag apron including substantially horizontal runs, feeding means to deliver objects to the upper run of said apron in a thin stream, an apertured screen, means to retain objects upon said apron during its movement about the end thereof from said feeding means to said screen, the turning action of said apron causing objects of greater length than the size of the screen apertures to be positioned transversely with respect to the path of movement of said apron, a second apron to which objects fall through said screen, a second screen over which said second apron moves objects, said second screen having transversely elongated apertures therein, means to move said aprons, said second apron being operated at a faster speed than said first apron to cause objects to be deposited upon said second apron in a thinner stream than upon said first apron and moved over said second screen by a rolling action.

2. An apparatus for screening fibrous objects, including an endless drag apron including substantially horizontal runs, feeding means to deliver objects to the upper run of said apron in a thin stream, an apertured screen, a second drag apron including substantially horizontal runs, the upper run thereof being arranged to receive objects passing through said screen, means to move said aprons arranged to move said second apron at a faster speed than said first apron to cause objects to be deposited upon said second apron in a thinner stream than upon said first apron, and a second screen over which objects are moved by said second apron, said second screen having transversely elongated apertures therein, the depositing of objects in a thin stream upon said second apron causing the objects to be moved over said second screen by a rolling action so that fibres will be scraped therefrom by the edges of the apertures.

3. An apparatus for screening fibre coated seeds including an apertured screen, a belt member for moving the seeds with respect to said screen, the apertures of said screen being of such size that the seeds will drop therethrough, a second screen beneath said first screen and having transverse slots therein of less width longitudinally of the screen than the diameter of the seeds, and a second belt member provided with drags and to receive the seeds passed through the apertures of said first screen member and move them over said second screen, said drags having straight lower edges and said drags and slots being substantially parallel so that the seeds will move across and against the edges of the slots so that fibres will be scraped therefrom by the edges of the slots.

4. An apparatus for screening fibre coated seeds including a screen provided with apertures of greater diameter than the seeds, a belt member including spaced drags to form pockets for moving material with respect to said screen, said drags serving to space said belt member from said screen, the spacing between said belt member and screen being insufficient to permit long particles from becoming up-ended in the pockets with respect to said screen, a second screen beneath said first screen, a belt member including transverse drags having straight lower edges for moving material with respect to said last named screen, said second screen having transverse rows of transverse slots therein, the slots of certain rows being offset to extend past the ends of the slots of other rows and each slot being of less width longitudinally of said screen than the diameter of the seeds so that the seeds will roll upon said screen and fibres will be scraped therefrom by the edges of the apertures.

ALEXANDER S. MACKENZIE.